Figure 1:
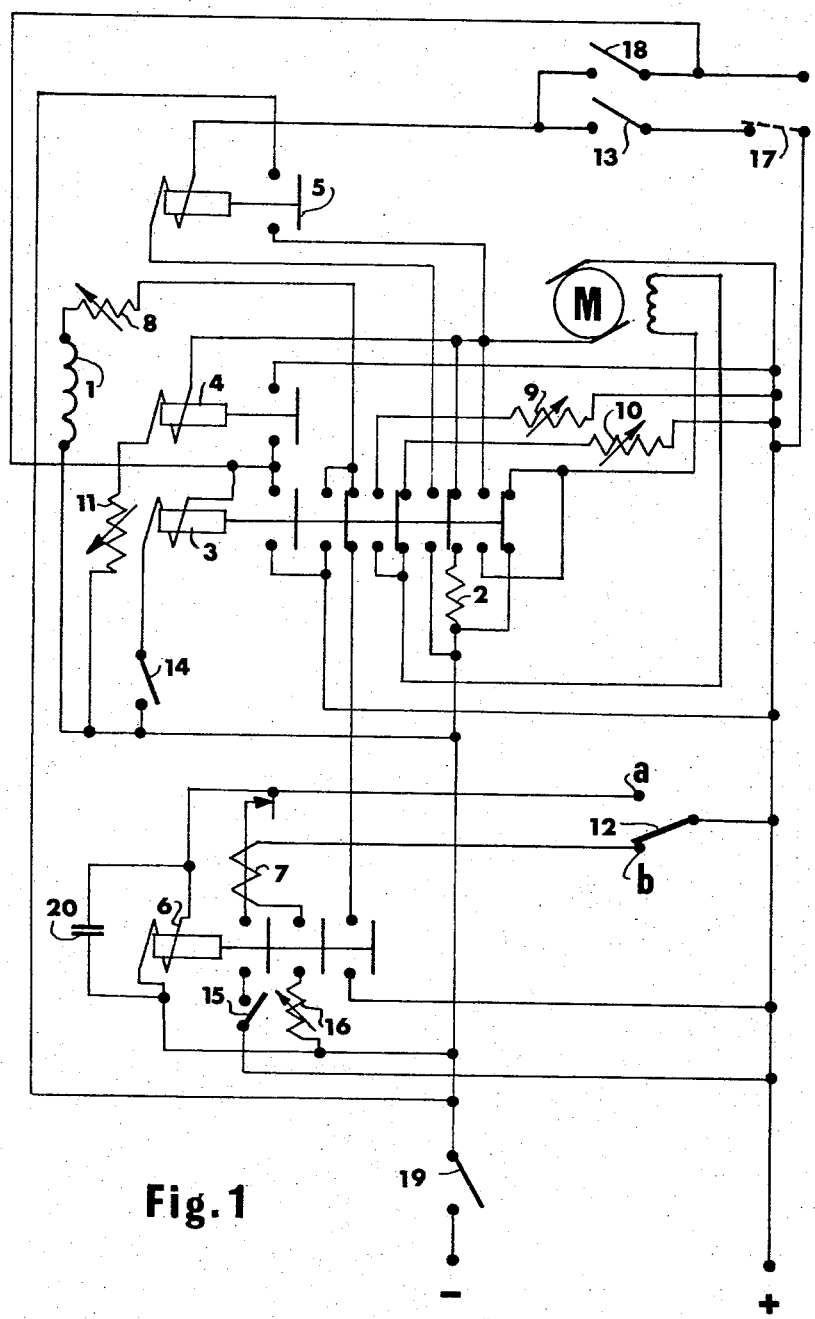

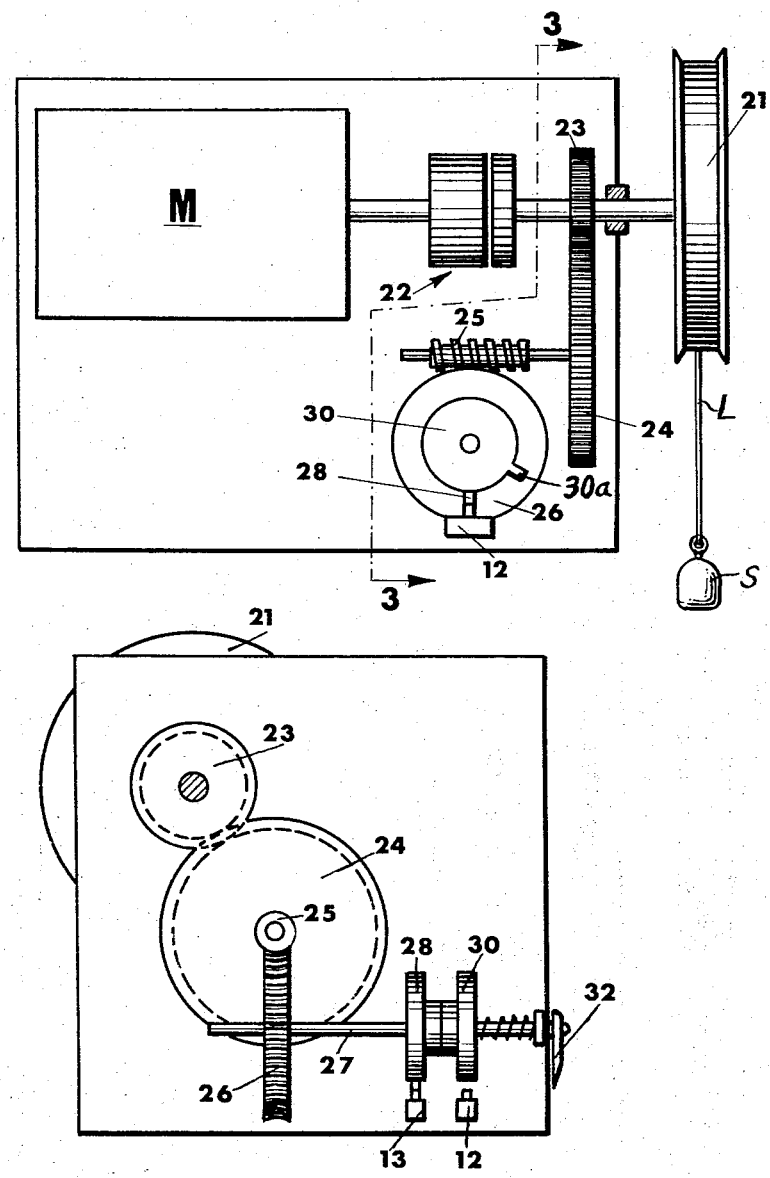
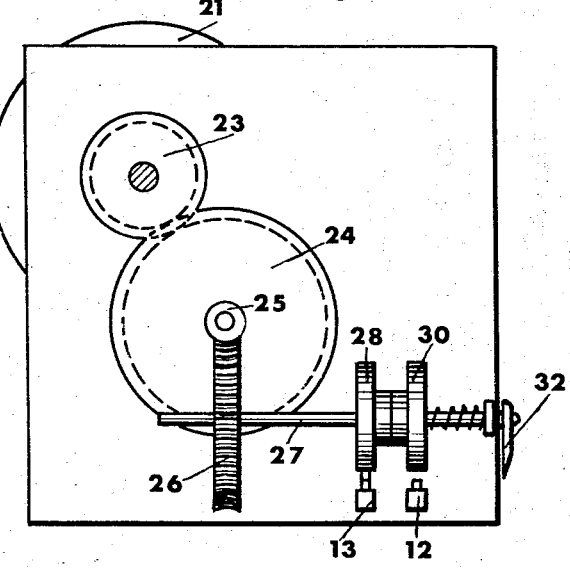

United States Patent Office 3,365,833
Patented Jan. 30, 1968

3,365,833
AUTOMATIC FISHING MACHINE
Thorbjörn N. Y. Christiansen, Nyksund,
Vesteralen, Norway
Filed July 31, 1964, Ser. No. 386,540
7 Claims. (Cl. 43—15)

The present invention relates to an electrically driven, automatic fishing machine to be used for jigging (snatching) as well as for bobbing, the machine comprising a depth adjustment by means of a cam disc, an automatic hauling arrangement actuated by increased load, as well as a device for releasing the automatic drive in order to use the machine as a winch, such as for hauling and coiling automatically of a fishing line by mounting a special line reel with accessories.

The machine according to the invention comprises a line pulley electrically motor driven through a magnetic coupling to be used for jigging and bobbing with automatic reversing of the direction of rotation of the pulley and means for automatic hauling at increased load, and the machine is characterized in that when using the machine for bobbing, the upward movement of the line may be adjusted by means of a thermo relay adjustable by a variable resistor, the inductor winding of the magnetic coupling being energized for a period determined by the adjustment of the relay by means of the resistor, all adjustments being carried out from the outside of a watertight box or casing enclosing all electric components.

One embodiment of the invention is illustrated by way of example, in the drawing, wherein FIGURE 1 illustrates the wiring diagram for the electrically driven automatic fishing machine according to the invention, FIGURE 2 is a schematic longitudinal view, and FIGURE 3 is a transverse cross section taken on line 3—3 of FIGURE 2.

In the drawing is illustrated a magnet coil 1 for an electromagnetic coupling 22, which is adjusted by means of a variable resistor 8. The embodiment illustrated in the drawing further comprises a resistor 2, a number of relays 3, 4, 5, 6 and 7, several variable, adjustable resistors 9, 10, 11 and 16 for regulating the various functions during fishing, and various switches 12, 13, 14, 15, 18 and 19 serving for the release of a line L in predetermined positions and to start certain functions during fishing.

For a better understanding of the invention the successive functioning of the preferred embodiment shall be explained in detail.

The main switch 19 is operable from outside a watertight box enclosing all electrical components. Upon operation of switch 19 the rotor current to the motor passes through the fixed resistor 2 and the motor M is started, which will run with a speed determined by a resistor 10 provided in the stator circuit. Between the motor M and a line pulley 21 is provided the electromagnetic coupling 22, the coil of which is designated 1 in the wiring diagram in FIGURE 1. The circuit comprising the coil 1 is initially open. The depth to which it is desired that the line should descend is adjusted by initially setting the projection 30a of cam disc 30 in a particular angular position relative to switch 12 by rotating the cam disc 30 by means of an adjusting handle 32. The line L is drawn off the pulley by the sinker S until the cam disc actuates the switch 12 to shift it to contact a. The relay 6 then is energized and the circuit of the magnet coil 1 is closed, whereupon the magnetic coupling 22 is engaged.

If the switch 15 is open, the arrangement will operate in a way suitable for jigging. The capacitor 20 will delay the function of the relay 6 in such a way that the cam disc 30 having moved the switch to contact a, the line L will continue to play out further 1–1.5 metres, as the circuit of the coil 1 is still not closed. After completion of the delayed action of relay 6, caused by capacitor 20, corresponding to a continued run of the line for a depth of 1–1.5 metres, the coupling 22 engages and the motor rotates the line reel 21 in the opposite direction. This is continued until the cam disc 30 again contacts switch 12 and now moves the same to contact b. The relay 6 is no longer energized and opens, which interrupts the circuit of the coil 1. The line is again drawn out and the cam disc 30 moves the switch 12 to contact a, whereupon the fishing cycle is repeated. The switch is of such construction as to be movable between the contacts a and b under the action of projection 30a in dependence upon the direction of rotation of cam 30 as is well known in the art. If the switch 15 is closed, the fishing machine functions as a so-called "bobbing"-machine which means that the line pulley is rotating and coiling the line for 3–30 seconds according to the adjustment of the resistor 16 for the thermo-relay 7.

When fishing according to the "bobbing" principle, the arrangement functions in the same way as by jigging until the cam disc 30 on its return movement changes the switch 12 to contact b. Now, the current may pass through the coil of the relay 6 over the switch 15. Further the current passes through the thermo-relay 7 over the resistor 16. Thus, the coupling 22 with the coil 1 is maintained energized until the thermo-relay 7 interrupts the current to the coil 6. The line will play out until the cam disc 30 contacts the switch 12 and moves it to contact a. Then the fishing cycle is repeated. If a fish is hooked during the upward movement of the line, the constant resistor 2 in connection with the adjustable resistor 11 will cause the increased rotor current to close the relay 4 which in turn closes the relay 3 independent of the relay 6, and thus maintains the coil 1 for the magnetic coupling 22 in energized state. The relay 3 changes the stator circuit, causing the current to go through the resistor 9. The resistors 9, 10 are adjustable in such a way as to make the hauling speed different from the fishing speed.

The contactor 5, the coil of which is connected over the contact of the relay 3, is energized and the rotor current to the motor passes the contacts of the contactor 5 and bypasses the resistor 2. The hauling function is continued until the fixed stop of the control member opens the switch 13 (cam disc 28 in FIGURE 3), whereupon the contactor 5 is de-energized. The motor comes to a stop, but the relay 3 still is energized and consequently the magnetic coupling still is engaged and the coupling will as a result of the inertia of the gear-transmission from the motor to the coupling retain the fish and sinker at the water surface until it may be removed. The release switch 14 is operated manually and opens the current circuit to the relay 3. The motor again receives rotor current and will re-start.

The circuit of the coupling will be interrupted and the line L descends again to the predetermined depth, whereupon the functions are repeated, as described above. If the double throw switch 17 is operated, the switch 13 is rendered ineffective and the line pulley will be working after being braked in such a way that the relay 3 is energized as a winch without stopping in the uppermost position. Starting and stopping of the motor may be remote controlled by means of the switch 18, and the magnetic coupling is continuously energized through the relay 3.

FIGURES 2 and 3 schematically illustrate an embodiment of the fishing machine in longitudinal and transverse cross sections, respectively for a better understanding of the function of the invention. The line pulley 21 is driven via electromagnetic coupling 22 from the electric motor M, the power of the magnetic coil 1 being adjustable by the resistor 8. The line pulley 21 in turn drives a gear wheel 23, meshing with another gear wheel 24 on the shaft of which is mounted a worm, driving a worm wheel 26, carrying the cam disc 28 acting on switch 13. This switch 13 serves to disengage the motor when the line or the sinker arrives at the top position during hauling. The cam disc 28 has frictional contact with cam disc 30, the projection 30a of which in turn acts on switch 12 in a particular position of cam disc 30. Thus, the two cam discs form a slip clutch, and the angular position of disc 30 is adjustable by means of handle 32 for regulating the depth to which the line shall descend as determine by the action of the projection 30a on the cam disc 30 on the switch 12. The switch 12 is, as mentioned above, in connection with FIGURE 1, adapted to energize the coil 1 of the magnetic coupling for engagement, respectively for jigging or bobbing.

What I claim is:

1. An automatic fishing machine comprising a rotatable pulley shaft, a line pulley mounted on said pulley shaft for receiving a fishing line to be wound on said pulley, a continuously rotating drive shaft, an electric motor coupled to said drive shaft to drive the same, electromagnetic coupling means between said motor and said pulley for interconnecting said drive shaft and said pulley shaft when energized, control means driven by said pulley shaft for selectively energizing or de-energizing said electromagnetic coupling means to haul in the line or play out the line respectively, and electric circuit means connecting said control means, the electric motor and the electromagnetic coupling means, such that the coupling means can be energized for selected periodic intervals to provide vertical oscillatory movement of the line between upper and lower limit positions, said electric circuit means including adjustable means for regulating the magnitude of the oscillatory movement by changing one of said limit positions and leaving the other fixed.

2. A machine as claimed in claim 1 wherein said electrical circuit means comprises means for automatic hauling of said line upon increased load thereon including a relay coupled to the motor and actuated by increased current in the motor produced by increased load on the line wound on the pulley, a second relay operated by the first relay when the latter is energized, said second relay being coupled to the electromagnetic coupling means to continuously energize the latter when the second relay has been operated by the first relay, and an externally adjustable resistor connected to the second relay and the motor for varying the motor speed.

3. A machine as claimed in claim 2 wherein the electrical circuit means comprises means for automatically altering the current in the stator circuit of the motor to automatically change the rotational speed of the line pulley from an adjustable oscillatory speed to a different and adjustable hauling speed.

4. A machine as claimed in claim 2 wherein said control means comprises first and second cam means driven from the line pulley shaft, switches included in said electrical circuit means and actuated by respective cam means, the first cam means being non-adjustable and acting on a corresponding switch for disconnecting of the motor when the line arrives at an uppermost position during hauling, the second cam means being in frictional engagement with the first cam means and being angularly adjustable relative to its corresponding switch for limiting the depth to which the line descends, the second cam means being externally adjustable.

5. A machine as claimed in claim 1 wherein the electrical circuit means comprises means for disconnecting the automatic function of the coupling means caused by the electric circuit means to enable utilization of the machine as a winch.

6. A machine as claimed in claim 2 wherein the electrical circuit means comprises switch means which is actuated when the line reaches an upper position at the water surface to stop the motor while the magnetic coupling means is continuously engaged for holding the line, with its catch, unmoved at the water surface.

7. A machine as claimed in claim 1, wherein said adjustable means comprises a thermo-relay which when activated causes said coupling means to remain energized for an extended period with consequent raising of the upper limit position.

References Cited

UNITED STATES PATENTS 2,709,867  6/1955  Routh _____ 43—15
2,735,207  2/1956  Christiansen _____ 43—15
2,951,307  9/1960  Joy _____ 43—26.1

SAMUEL KOREN, *Primary Examiner.*

W. H. CAMP, *Assistant Examiner.*